United States Patent [19]
Kwok et al.

[11] Patent Number: 5,926,245
[45] Date of Patent: Jul. 20, 1999

[54] LIQUID CRYSTAL DISPLAY HAVING A SINGLE POLARIZER AND NO RETARDATION FILM COMPENSATION

[75] Inventors: Hoi Sing Kwok; Fei Hong Yu, both of Hkust, The Hong Kong Special Administrative Region of the People's Republic of China

[73] Assignee: The Hong Kong University of Science & Technology, The Hong Kong Special Administrative Region of the People's Republic of China

[21] Appl. No.: 08/826,800

[22] Filed: Mar. 25, 1997

[51] Int. Cl.[6] .................................................. C09K 19/02
[52] U.S. Cl. ........................................... 349/180; 349/181
[58] Field of Search ...................................... 349/180, 181

[56] References Cited

U.S. PATENT DOCUMENTS

| | | | |
|---|---|---|---|
| 5,004,324 | 4/1991 | Leenhouts et al. | 349/181 |
| 5,105,289 | 4/1992 | Sonehara et al. | 349/181 |
| 5,251,049 | 10/1993 | Sato et al. | 349/181 |
| 5,295,009 | 3/1994 | Barnik et al. | 349/98 |
| 5,361,151 | 11/1994 | Sonehara et al. | 349/180 |
| 5,555,113 | 9/1996 | Mulkens et al. | 349/181 |
| 5,726,723 | 3/1998 | Wang et al. | 349/75 |

*Primary Examiner*—William L. Sikes
*Assistant Examiner*—Tarifur R. Chowdhury
*Attorney, Agent, or Firm*—Burns, Doane, Swecker & Mathis, L.L.P.

[57] ABSTRACT

The invention provides a reflective liquid crystal display which consists of just an input polarizer, the liquid crystal cell and a rear reflector which can be placed inside or outside of the liquid crystal cell. There is no rear polarizer and no retardation film compensation. The invention is capable of producing a high contrast, low chromatic dispersion display. Depending on the twist angle chosen for the liquid crystal cell, the display can be used in direct view or in a projection type display. The display can also be driven in an active matrix mode or in a passive matrix multiplexed drive mode. A full numerical simulation which takes into account the liquid crystal director deformation under the application of an electric field was used to optimize such displays.

11 Claims, 8 Drawing Sheets

LIQUID CRYSTAL DISPLAY HAVING A SINGLE POLARIZER AND NO RETARDATION FILM COMPENSATION

FIELD OF THE INVENTION

This invention relates to a liquid crystal display (LCD) and in particular to a reflective LCD which consists of just an input polarizer, the liquid crystal cell and a rear reflector which can be placed inside or outside the liquid crystal cell. There is no rear polarizer and no retardation film compensation.

BACKGROUND OF THE INVENTION

Ordinary twisted nematic (TN) and supertwisted nematic (STN) liquid crystal displays (LCD) always have a front and a rear polarizer and operate in the transmittive or reflective modes. If the rear polarizer is eliminated, the reflector can be placed either outside the LC cell or inside it. In either case, the LCD can operate in the reflective mode only. Such LCDs have been theorised to have advantages since the brightness of such reflective displays is expected to increase considerably because of reduced absorption and scattering losses. In addition, there are several other advantages such as the elimination of parallax, higher pixel density and simpler manufacturing procedures. They can also be applied to crystalline silicon based active matrix LCDs which can only operate in the reflective mode. In the supertwisted case, these reflective displays can also be multiplexed as in STN displays.

PRIOR ART

H. S. Kwok, *J.Appl. Phys.* 80, 3687 (1996) discusses the use of the Jones matrix and a parameter space approach to the design of reflective displays. In particular, it discusses the solution space for a display which consists of only an input polarizer, the TN liquid crystal cell and the rear reflector with the input polarizer parallel to the input director of the LC cell. These are the so-called TN-ECB (electrically controlled birefringence) modes. It is shown that such TN-ECB displays are not practical because they are either too color dispersive, or the cell thickness required is too small.

In a co-pending patent application, the present inventors propose a retardation compensation film placed between the LC cell and the rear reflector, by means of which the color dispersion can be greatly reduced. Experimentally, the contrast ratio and the color dispersion properties of such retardation compensated displays are found to be excellent. Similarly, the use of a retardation film placed between the LC cell and the input polarizer was discussed by I. Fukucda, E. Sakai, Y. Kotani, M. Kitamura and T. Uchida, *J. Soc. Info. Display*, 3, 83 (1995) and I. Fukuda. M. Kitamura and Y. Kotani, p.881, *Asia Display, Proc. Of the 15th International Display Research Conference, Society for Information Displays*, 1995 where the results were quite satisfactory as well.

As mentioned above, the simplest reflective LCD consists of just the input polarizer, the liquid crystal cell and the rear reflector, as shown in FIG. 1. The parameters that can be varied in optimizing the properties of this RTN are the cell twist angle $\phi$, the cell thickness and birefringence product $d\Delta n$ and the angle $\alpha$ between the polarizer and the input director of the LC cell. This configuration has been used previously in reflective liquid crystal light valves (LCLV) and was first referred to as a hybrid field effect (HFE) LCD.

In the HFE mode, the twisted angles are usually 45° or 90°. The angle $\alpha$ is always 0° or 90°. Its operation relies on the nonuniform twist of the LCD at finite voltages so that the output light is elliptically polarized. In a sense the HFE mode is somewhat between the true ECB mode and the waveguiding TN mode and is indeed a hybrid of both. The maximum reflectance is always less than 100% since at these twist angles, the LCD is not truly optimized and the output is not linearly polarized.

T. Sonehara and O. Okumura. p192, *Japan Display, Proc. Of the 9th International Display Research Conference, Society for Information Display*, 1989 and T. Sonehara. *Jap. J. Appl. Phys.*, 29 L1231 (1990) refined these HFE modes by varying the twist angle $\phi$. They obtained optimal values at 63.6° and 190.8° where the reflectance of the display should in principle become 100%. These modes were called TN-ECB modes. K. Lu, B. E. A. Saleh, *J. Modern Opt.* 38, 2401 (1991), K. Lu, B. E. A. Saleh, *Society for Information Displays, Digest of Applications Papers*, p63 (1996) and K. Lu and B. E. A. Saleh, *Appl. Opt.* 30, 2354 (1991) and V. Konovalov, A. Muravski, S. Yakovenko, A. Smirnov, A. Usenok, *Society for Information Displays, Symposium Digest.* p615 (1994) also obtained similar results by varying $\phi$. Basically, in these modes, the output light becomes circularly polarized after going through the LC cell once. Therefore upon reflection and going through the LC cell again, the light becomes linearly polarized again but rotated by 90° relative to the input. It can be shown analytically that at $\alpha=0°$ or 90°, the optimal twist angles for TN-ECB cells were given by $$\phi = (2N-1)\frac{\pi}{2\sqrt{2}} \tag{1}$$

and $$d\Delta n = (2N-1)\frac{\lambda}{2\sqrt{2}} \quad \text{for } N = 1, 2, 3, \ldots \tag{2}$$

At these operating conditions, the reflectance of the LC cell is exactly zero or 100% depending on the arrangement of the polarizers. If a sheet polarizer is used as both the input and output polarizer as shown in FIG. 1, then R=0%. If a prism beam splitter type polarizer is used, as shown in FIG. 2, then in viewing from the orthogonal direction, R=100%. The latter case will be referred to as the cross polarizer (//-⊥) geometry and the former case as a parallel polarizer (//—//) geometry. The idea is that when a high voltage is applied to the cell, $d\Delta n$ will approach zero and the reflectance will become large (or small depending on the polarizers) since the LC will become homeotropic in alignment. Such TN-ECB displays therefore operate in the normally back (NB) mode with parallel polarizers and in the normally white (NW) mode with cross polarizers. The case of cross polarizers will be particularly useful, for example, in projection displays.

For the case of $\alpha=0°$ and 90°, the parameter space for the RTN display has been obtained and discussed previously. It is shown in FIG. 3. The major problems with these TN-ECB modes as represented by eqs. (1) and (2) are that they are either too dispersive or have $d\Delta n$ values that are too small to be practical. For the second and higher TN-ECB modes (N>1), the reflectance depends on wavelength strongly, as evidence from the sensitive change of R to $\Delta n$ in FIG. 3. It is not desirable for ordinary applications. For the first TN-ECB mode (N=1) at 63.6°, the dispersion is not too bad, but the $d\Delta n$ value of 0.19 $\mu$m is too small to be practical.

Typical LC has a Δn of 0.15 which makes the situation even worse. For these reasons, experimental results for the TN-ECB modes are far from ideal.

SUMMARY OF THE INVENTION

According to the present invention there is provided a reflective liquid crystal display comprising an input polariser only, a liquid crystal cell and a rear reflector and having no retardation film.

By means of the present invention it is possible to obtain high contrast and low color dispersion reflective LCDs with high brightness (large reflectance) without the use of retardation compensation films. The idea is to use the angle α between the input polarizer and the input director of the LC cell as an optimization parameter as well, in addition to the twist angle φ and the cell thickness-birefringence product dΔn of the LC cell. That is, α is no longer 0° or 90° as in the previous cases.

An important feature of the present invention is that unlike the prior art where only the static operation (V=0) was considered, here, the operating conditions of such reflective displays are optimized with full consideration of LC director deformation due to the applied voltage. Such dynamical simulations are necessary to obtain the true optimal conditions for the reflective displays, especially in comparing the contrast ratio and chromatic dispersion under an applied electric field. Below are described the details of such optimization as well as experimental results verifying the theoretical predictions.

Several operating conditions of the reflective LCD exhibit the desired properties of low dispersion and high contrast. In particular, there are operating points near the TN-ECB modes as well as near the traditional TN modes. For the series of optimal reflective modes that are near the TN-ECB modes, the twist angles are near 52° and 190°. They will be called the reflective TN (RTN) and reflective STN (RSTN) modes respectively. The RTN and the RSTN modes have very different applications and hence somewhat different optimization objectives.

By modifying the liquid crystal cell, the TN-ECB modes can be changed into the RTN and RSTN modes which are much more practical. The most important observation is that instead of having the zero voltage state corresponding to one of the reflectance minima (or maxima for //-⊥ polarizers) in FIG. 3, and rely on a high voltage to turn the display on, we can operate the display at dΔn above the TN-ECB minima at V=O. This is illustrated in FIG. 4 where we plot the reflectance as a function of dΔn. Instead of operating between dΔn=0.19 μm at V=0 and dΔn =0 μm at V=large, as attempted by Sonehara et al, one can operate the display between dΔn=0.5 μm at V=0 and dΔn=0.19 μm at V=finite. In other words, for the //—// geometry, instead of a NB mode, we can have a NW mode of operation. The cell gap requirement is now much more practical. The dΔn value of 0.5 μm is actually near the first Mauguin minimum for ordinary TN displays.

Of course the above argument is only qualitative. As V increases, not only Δn will decrease, the twist and the tilt angles will also change. So a more elaborate calculation is needed to vary the operating parameters in order to "hit" the dark state at an appropriate voltage. In order to do that, a full simulation to obtain the reflectance-voltage (R-V) curve is required.

The above picture is for a parallel polarizer NW arrangement. The contrast of this display depends on how small R can be made into at the dark state. It can be shown that the exact TN-ECB modes with φ given by eq. (1) will have relatively poor contrast ratios. In the cross polarizer arrangement, FIG. 3 is reversed with R changed into (1-R). Hence the display will be dark at V=0 and bright at a finite V. Since one can always make R very small at V=0 according to FIG. 3, the contrast ratio of this display can be very large always. Then the problem of not "hitting" exactly the TN-ECB mode minima will not be so serious, since that only means that the maximum reflectance will not be 100%, but a smaller number.

An additional advantage of the present scheme of "biasing" the V=0 operating point of the display away from the TN-ECB minima is that both the dark and bright operating voltages are now relatively small. In the traditional TN-ECB mode, either the bright or dark state has to correspond to the homeotropic alignment which requires rather high voltages to achieve. In the present invention, the homeotropic state is never involved. The operating voltages are always smaller than the homeotropic voltage.

BRIEF DESCRIPTION OF THE DRAWINGS

Some embodiments of the present invention will now be described by way of example and with reference to the accompanying drawings, in which.

DETAILED DESCRIPTION OF PREFERRED EMBODIMENTS

In the following description details of the requisite Jones matrix simulation technique are to be found in H. S. Kwok, *J.Appl.Phys.* 80, 3687 (1996) referred to above and which is incorporated herein by reference.

(A) The RTN display

As mentioned above, referring to FIG. 3, the cell can be designed with a ($\phi$, d$\Delta$n) value where R=0, and is just above the first TN-ECB mode of (63.6°, 0.19 $\mu$m). This corresponds to the combination of (63.6°, 0.5 $\mu$m). When a voltage is applied, $\Delta$n decreases and the reflectance will increase before decreasing again. In order to achieve a dark state with an applied voltage, a full numerical simulation is necessary. For each combination of $\phi$, d$\Delta$n and $\alpha$, the entire reflectance-voltage (R-V) curves have to be obtained. These R-V curves have to be obtained at the three primary colors of red, green and blue in order to examine their color dispersion. The best combination will be chosen as the optimum.

The choice of the optimal ($\alpha$, $\phi$, d$\Delta$n) combination has to be guided by the parameter space diagrams. In the following discussions, a NW display will be assumed. The approach is: (1) Find a ($\alpha$, $\phi$, d$\Delta$n) combination that will produce a broad R=100% region for different wavelengths at V=0. (2) For each such ($\alpha$, $\phi$, d$\Delta$n) combination, perform the calculation to obtain the dynamic R-V curves to see which ones will produce the lowest reflectance and is the least dispersive when a voltage is applied.

Optimization of the RTN near the first TN-ECB mode will lead to a RTN which can be driven by an active matrix. Optimization near the second TN-ECB mode will lead to an alternate STN display and shall be called reflective STN (RSTN) display. These RSTN can be driven by passive matrix and can be multiplexed as ordinary STN.

Figure 3:
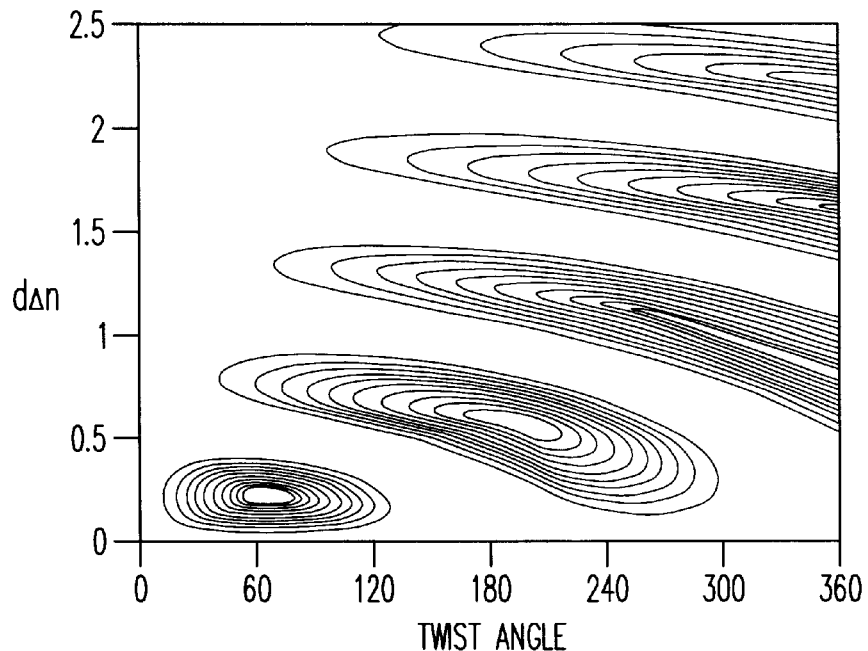
FIG. 3 shows the parameter space for a //—// reflective LCD with α=0° or 90°, the constant reflectance contours are in steps of 10%.
Figure 4:
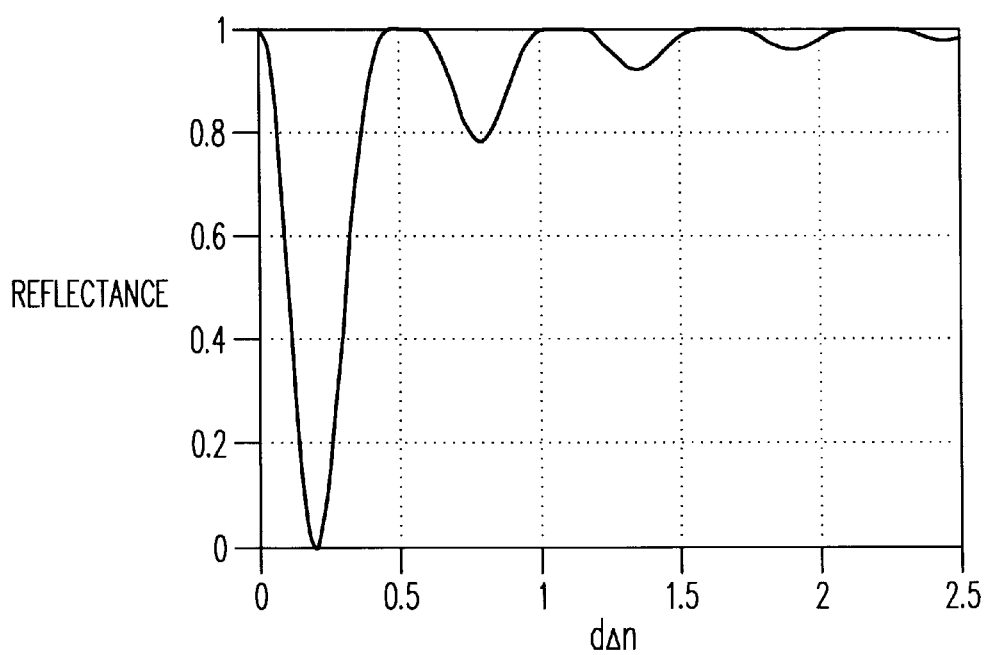
FIG. 4 shows the reflectance as a function of dΔn for φ=63.6°.
Figure 5:
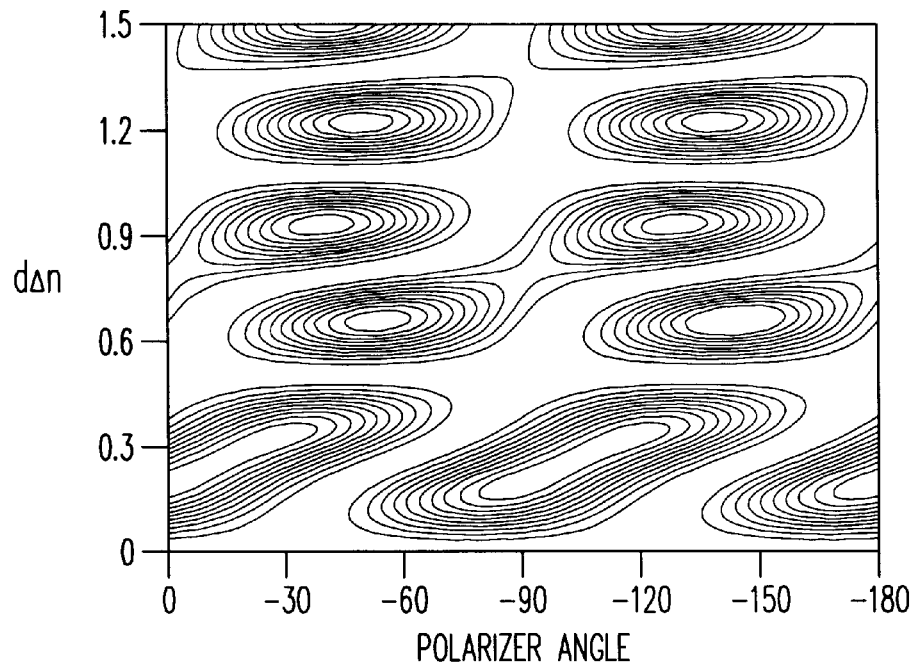
FIG. 5 shows the α- dΔn parameter space for φ=52°, the constant reflectance contours are in steps of 10%, starting with 100% along the x-axis.

The R=100% condition is represented by the white region in FIG. 3. For several values of $\phi$ near 63.6°, we plot the $\alpha$-d$\Delta$n parameter space. FIG. 5 is an example of a $\alpha$-d$\Delta$n parameter space for $\phi$=52° at the voltage-off state. From each of these parameter space diagrams, the combinations of d$\Delta$n and $\alpha$ can be found that will give a reflectance of 100% and the sensitivity to $\Delta$n change is small. These points are actually quite easy to identify since they always correspond to a broad peak. For example, in FIG. 5, the point (–10°, 0.55 $\mu$m) will be a good candidate for future calculation.

The next step is to obtain the R-V curves for these potential operating points. In order to obtain the R-V curves, the standard procedure for LC modelling is follows: First the one dimensional Euler-Lagrange equations for the director deformation are solved to give the director angles $\phi$(z) and $\theta$(z) for all values of z inside the LC cell for any value of applied voltage. Then the reflectance is calculated by dividing the cell into many layers and treating each layer as a birefringent plate, and multiplying together all the Jones matrices.

Figure 6:
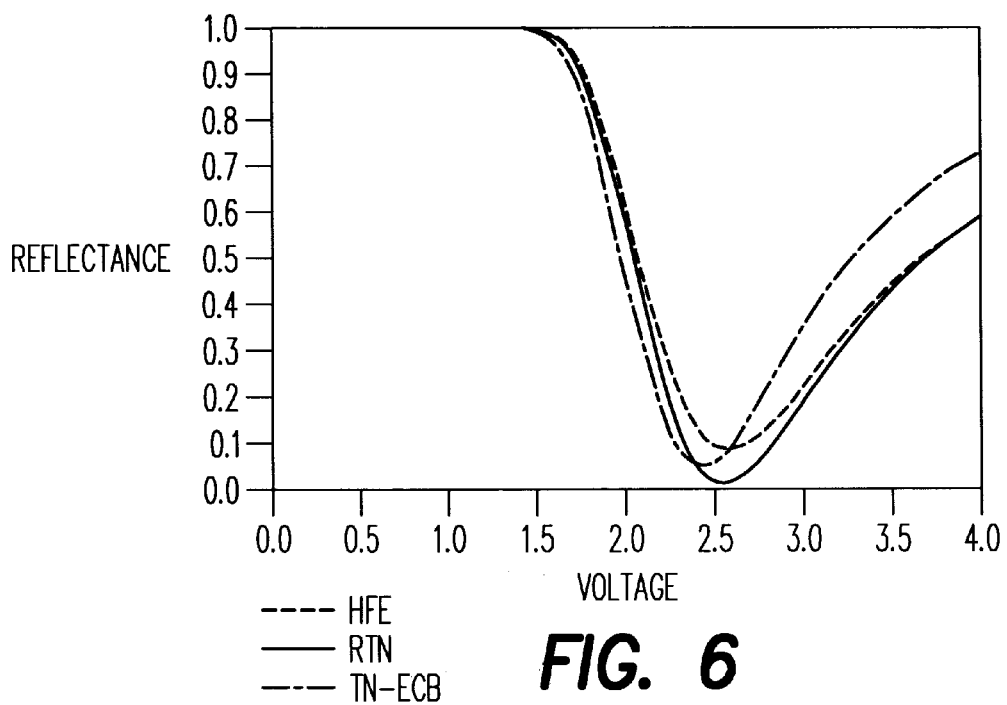
FIG. 6 shows calculated reflectance-voltage curves for NW operation for the HFE, TN-ECB and RTN modes, only the RTN mode reaches to zero reflectance when a voltage is applied.

FIG. 6 shows the results of such a calculation. It shows the R-V curves for three cases discussed in section 2. They corresponds to the hybrid field effect mode (HFE), the first Sonehara TN-ECB mode and the new optimized RTN. They have different values of $\phi$ and d$\Delta$n. the values of the elastic constants used for this calculation are those of a typical liquid crystal with a pretilt angle of 1°. A wavelength of 550 nm is assumed. In all cases R=100% at V=0 by definition.

It can be seen that a threshold voltage of 1.5 volts is obtained, followed by a decrease in reflectance. A minimum reflectance at about 2.5 volts is obtained in all cases. At high voltages above 10 volts, R approaches 100% again. It corresponds to the LC cell becoming homeotropically aligned.

The dotted line represents the hybrid field effect mode of $\phi$=45°. A d$\Delta$n of 0.54 $\mu$m is used in the calculation. For this case, a minimum of R=10% is reached at 2.6 volts. Hence the contrast of this display will be 10:1. The dash line corresponds to the case of $\phi$=63° and d$\Delta$n=0.5 $\mu$m. This point is right above the TN-ECB mode in the parameter space diagram in FIG. 3 as discussed above. If the parameter space diagram is valid for nonzero V as well, then this R-V curve should pass through the TN-ECB point of R=0%. Instead, it can be seen that the minimum reflectance is about 6%, occurring at V=2.5 valts. This display will therefore have a upper limit of 16:1 in contrast ratio.

Figure 1:
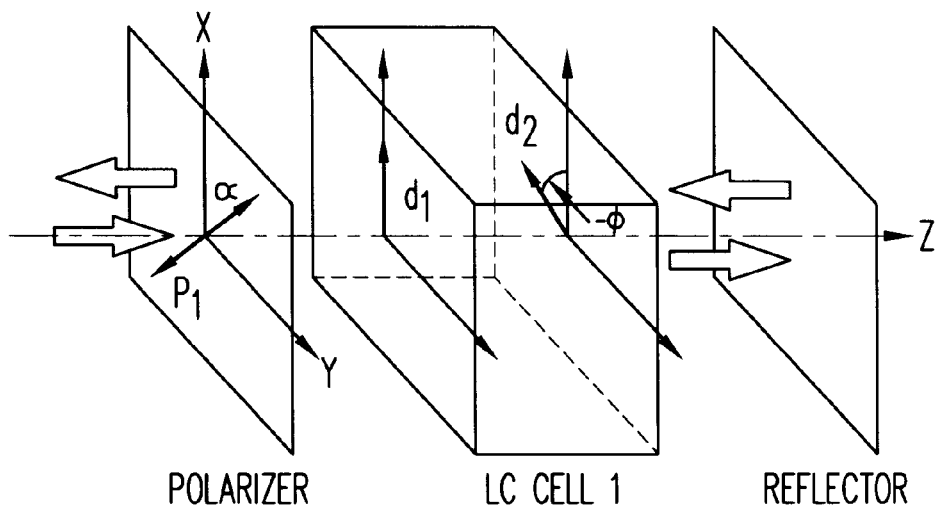
FIG. 1 is a schematic diagram of a direct view reflective LCD, the coordinate systems are shown.
Figure 2:
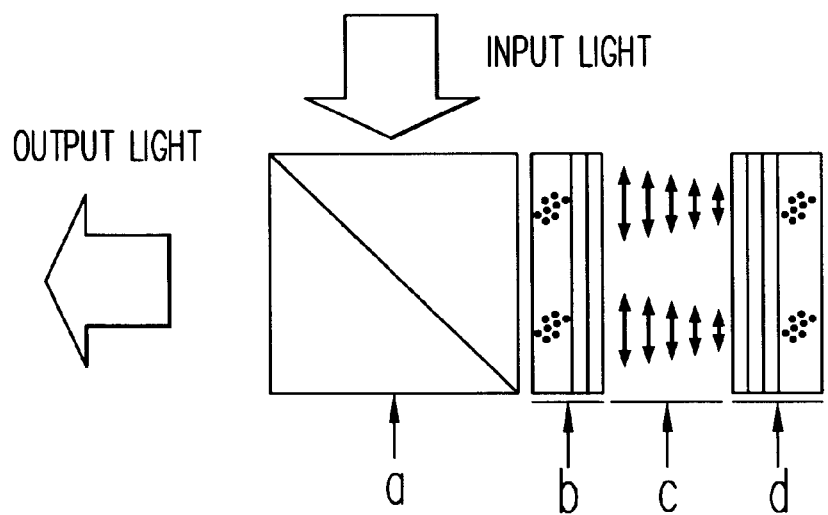
FIG. 2 is a schematic diagram of a projection type reflective LCD. a: prism cube beam splitter; b: glass plate with ITO and LC alignment layer; c: Liquid Crystal layer; d: glass plate with electrodes, reflective layer and alignment layer.
Figure 7:
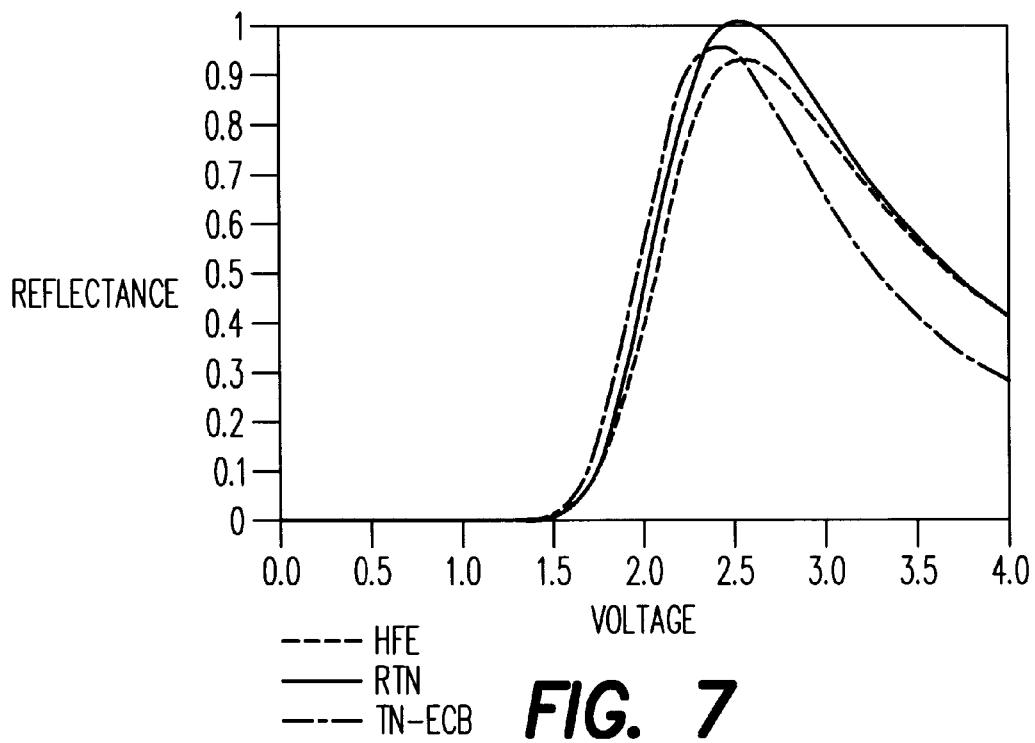
FIG. 7 shows calculated reflectance-voltage curves for NB operation for the HFE, TN-ECB and RTN modes.

For the optimized RTN, the R-V curve goes through a minimum reflection of near 0%. Hence the contrast of this display will be extremely high. So for a NW display, it makes a big difference whether ones chooses the HFE, TN-ECB or RTN mode for operation. However, it should be noted that if a NB display is desired, then all the R-V curves should be inverted. R will be replaced by (1-R) as shown in FIG. 7. In this case, the minimum reflection is always near 0% by definition. So the difference between the 3 different modes will manifest itself in the peak reflectance. The peak reflectance will be 100%, 94% and 90% for the RTN, TN-ECB and HFE displays respectively. This difference is not so large. However, this NB operation requires the polarizer to be in a //-$\perp$ arrangement. This is possible only for a projection display as shown in FIG. 2.

Figure 8:
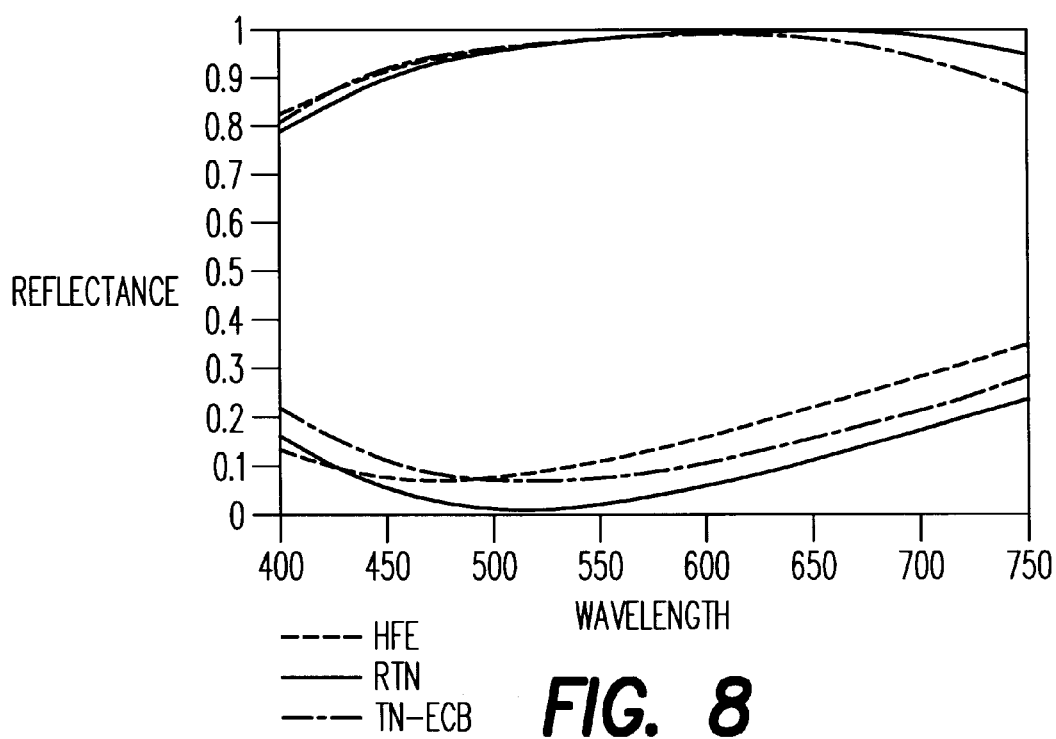
FIG. 8 shows calculated reflectance spectra for the NW mode of operation at V=0 (upper curves) and V=2.6 volts (lower curves)
Figure 9:
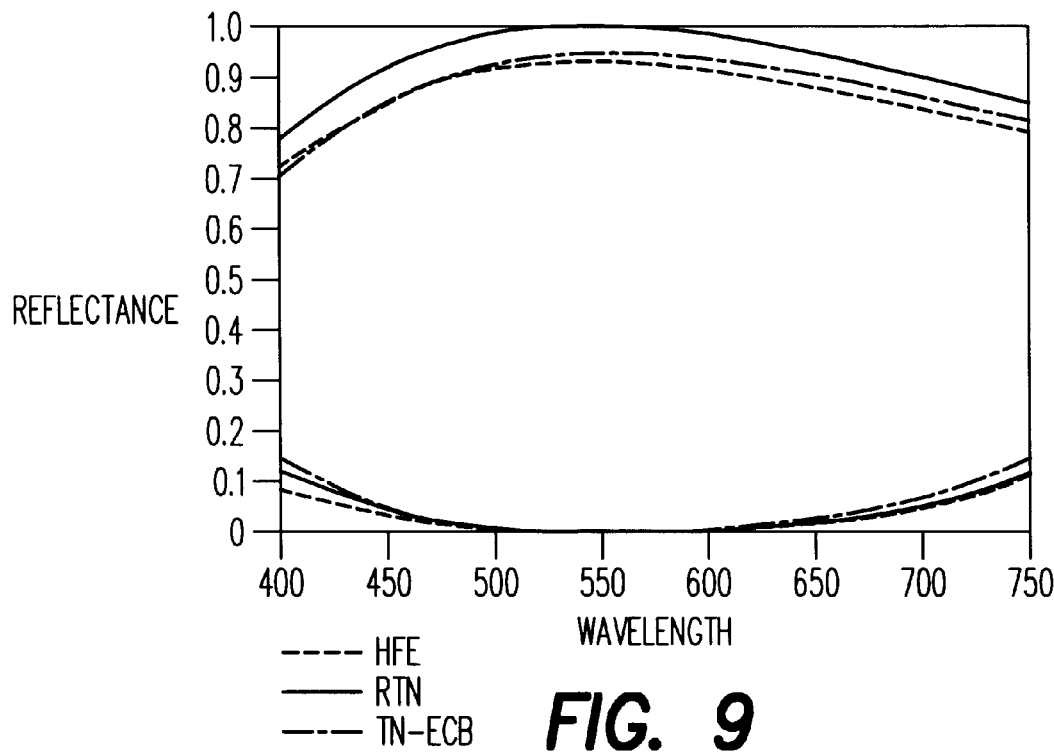
FIG. 9 shows calculated reflectance spectra for the NB mode of operation at V=0 (lower curves) and V=2.6 volts (upper curves)

For all three cases, the complete reflectance vs. wavelength curves are obtained. This is shown in FIG. 8 for both the field-off state (0 volts) and the field-on state (2.6 volts) for the NW situation. From FIG. 8, it can be seen that for the field-off state all three curves are almost coincident with each other. For the field-on state, the reflectance curves also show the same trends, except that the absolute reflectance and the position of the minima are not the same. FIG. 9 shows the calculated reflectance spectra for the NB case. It should be noted that these curves are not exactly the reverse of those in FIG. 8. This illustrates that the optimization conditions are not exactly the same for the NB and NW modes.

To verify the theoretical simulations, sample cells were made using the different conditions discussed above. The MLC-5300 and 5400 multi-bottle system from E.Merck were used in order to obtain a mixture with the desired $\Delta$n. Rubbed polyimide films were used to align the LC medium to produce the desired twist angles. One side of the LC cell has the usual indium-tin-oxide coating as the transparent electrode while the other surface was coated with aluminum to serve as the reflective electrode. A cross polarizer geometry was used as illustrated in FIG. 2. A green laser at 514 nm was used for the R-V curve measurement while a Photo Research SpectroScan PR650 spectrometer was used for the spectral measurement.

Figure 10:
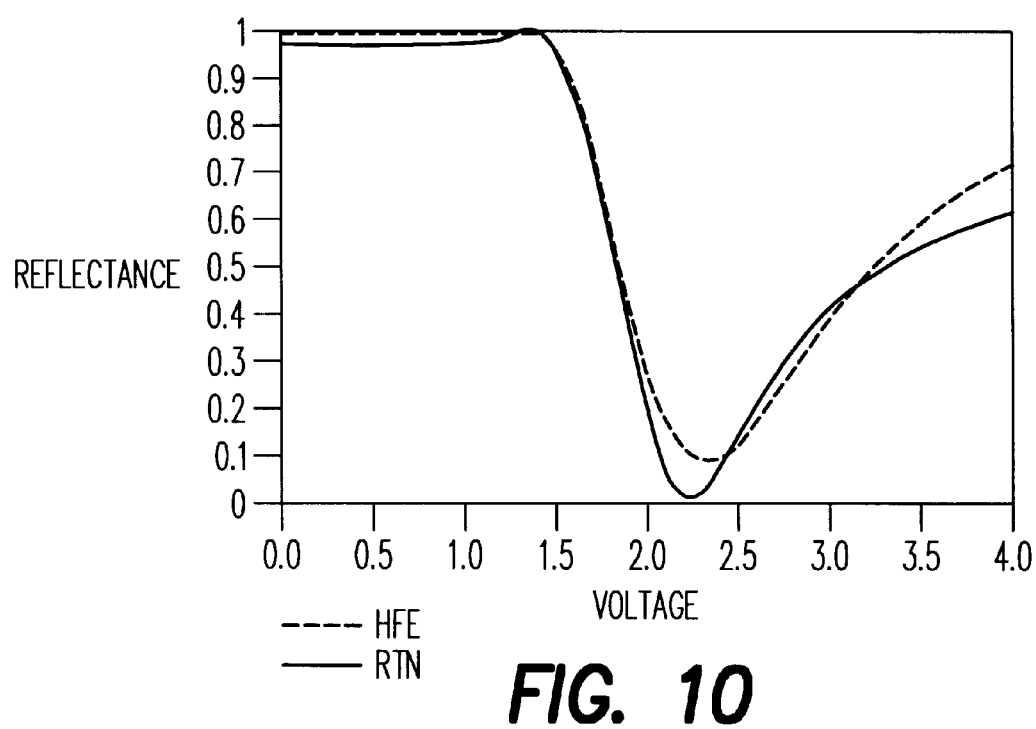
FIG. 10 shows measured reflectance-voltage curves for a RTN (solid line) and a HFE (dotted line) cell in a NW operation, note that the RTN minimum reflectance is near zone.
Figure 11:
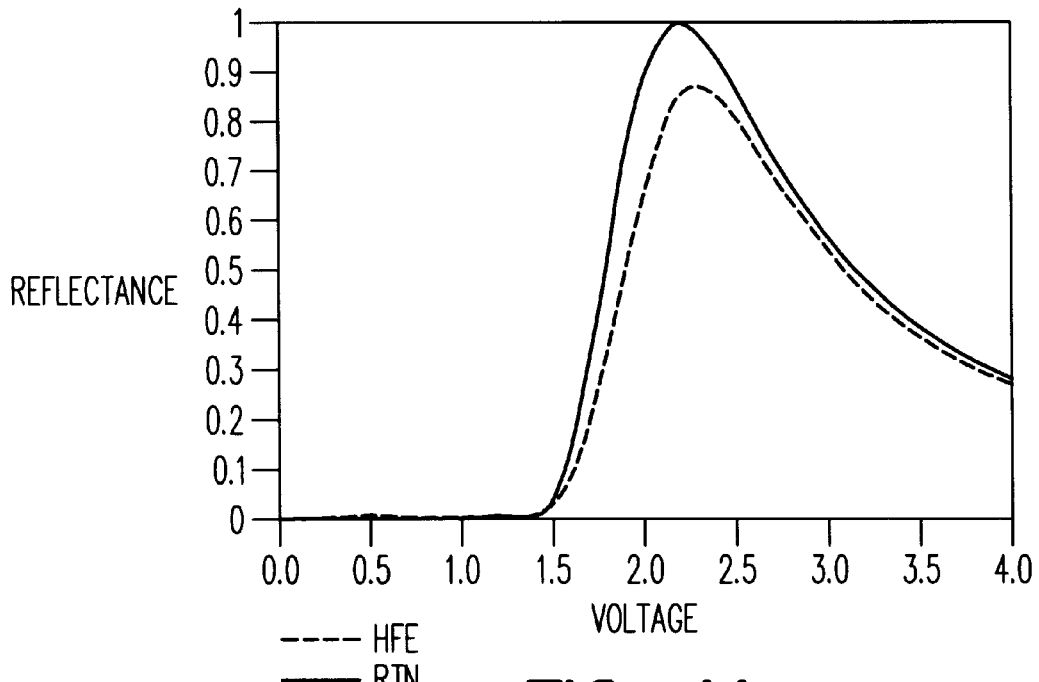
FIG. 11 shows measured reflectance-voltage curves for a RTN (solid line) and a HFE (dotted line) cell in a NB operation.

FIG. 10 shows the measured reflectance-voltage curves for the 45° HFE and the optimized RTN cells. The agreement between the curves in FIG. 10 and those in FIG. 7 is remarkable. Even the threshold voltage measured is as predicted, despite the uncertainties in the elastic parameters used in the simulation due to mixing of different liquid crystals to adjust the d$\Delta$n value. As expected, the RTN cell gives near zero reflectance at 2.2 volts while the HFE has a minimum reflectance of about 9%. The measured contrast ratio of the RTN display is well over 200:1. FIG. 11 shows results of the same measurement with a NB polarizer arrangement. The result is as expected as well. The minima in FIG. 10 becomes a maxima in FIG. 11. The contrast ratio of both displays are excellent since the reflectance at V=0 is near zero in both cases.

Figure 12:
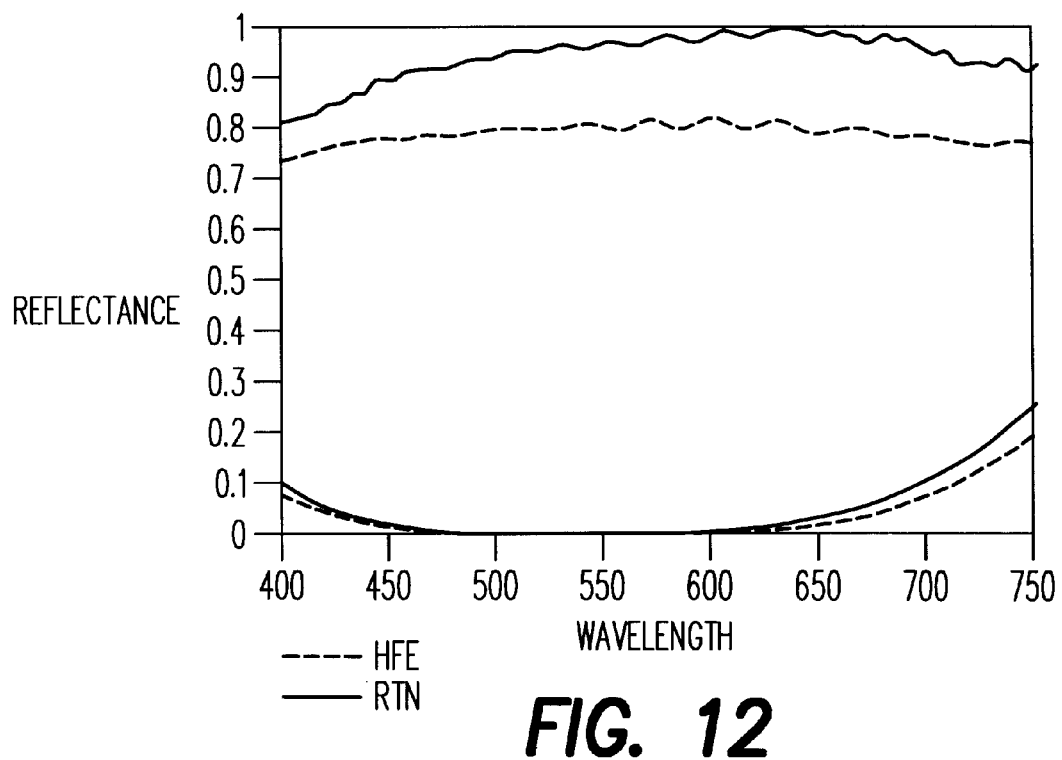
FIG. 12 shows measured reflectance spectra for a RTN (solid line) and a HFE (dotted line) cell in a NB operation.

FIG. 12 shows the measured reflectance spectra for a NB display for both the field-off and field on states for the HFE and RTN modes. These curves are not the same as the calculated ones, especially the field-on states. The discrepancy is attributable to the polarizing beam splitter used in the experiment. It is well-known that it is very difficult to obtain broadband polarizing beam splitters. Additionally, there is also the problem of the light source used in the spectral measurement. Because of the low intensities of the light source at the blue and red ends of the spectrum, the data is quite noisy. Nevertheless, the agreement between experiment and theory is quite satisfactory. From the theoretical and experimental results, it can be seen that the RTN cell has the highest light efficiency, least chromatic dispersion and highest contrast ratio. The experimental contrast ratio is over 200:1 though higher values should be possible.

(B) The RSTN display

Figure 13:
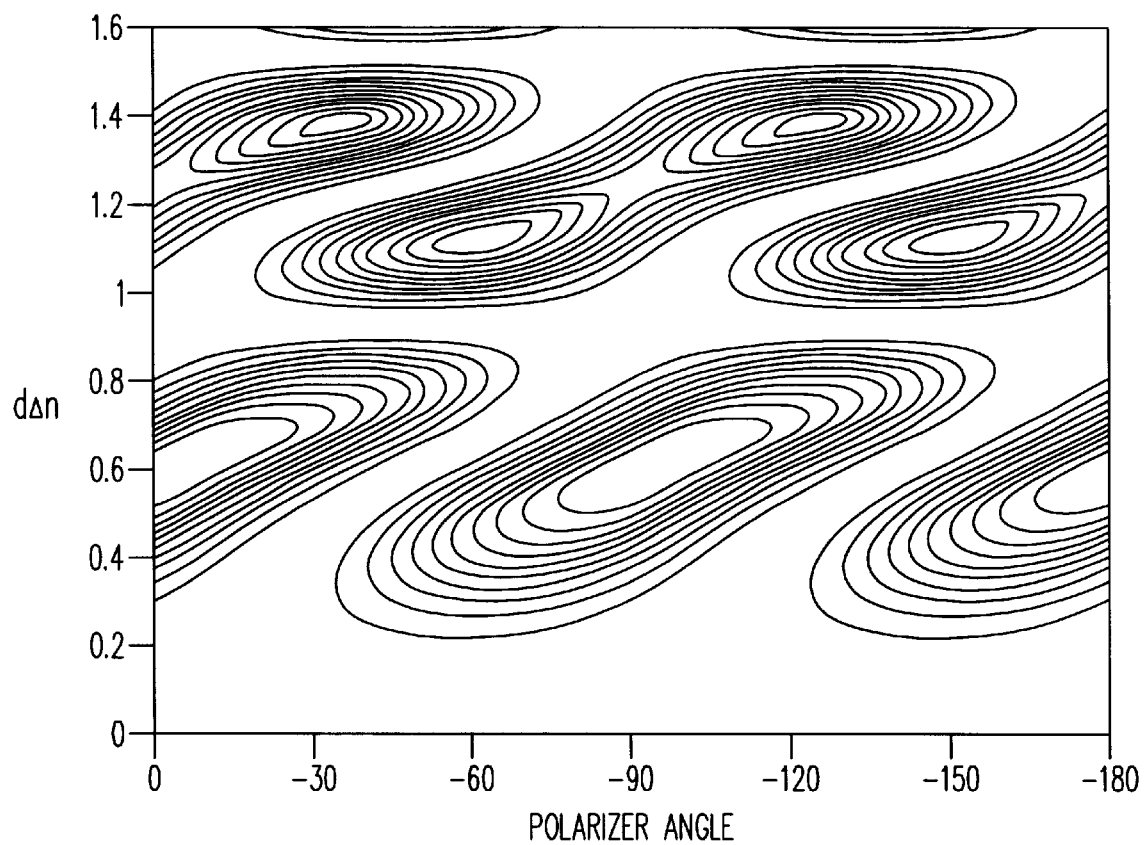
FIG. 13 shows an example of an α—dΔn parameter space diagram for φ=180°.

FIG. 13 shows an example of a $\alpha$-d$\Delta$n parameter space for $\phi$=180°. From this diagram, it can be seen that there are many combinations of d$\Delta$n and $\alpha$ that will give a reflectance of 100% (NW). The optimal condition was then further refined by finding a ($\alpha$, d$\Delta$n) combination that will produce a broad R=0% region when a voltage is applied. This second procedure is the crucial step in RLCD design. In order to obtain the reflectance-voltage curves for each set of ($\alpha$, $\phi$, d$\Delta$n), the standard procedure for LC modelling is followed: First the 1D Euler-Lagrange equations for the director deformation are solved to give the director angles $\phi$(z) and $\theta$(z) for all values of z inside the cell. Then the reflectance is calculated by dividing the cell into many layers and treating each layer as a birefringent plate, and multiplying together all the Jones matrices.

Figure 14:
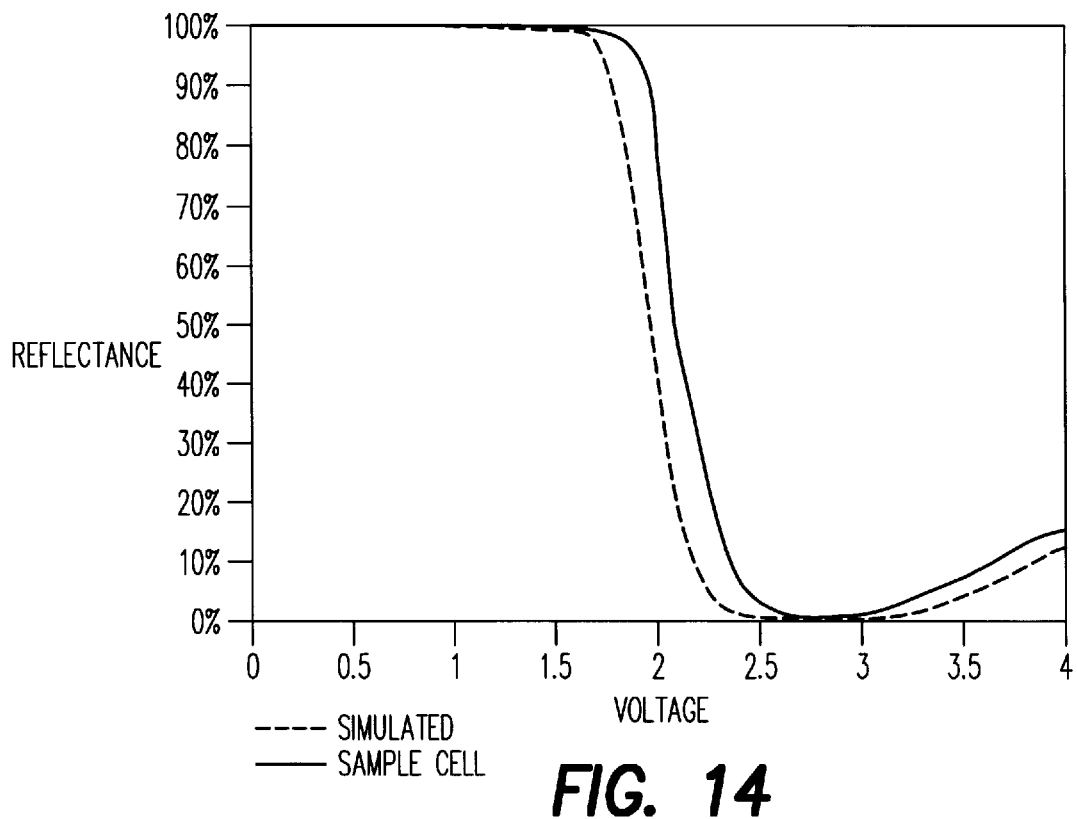
FIG. 14 shows a comparison of the simulated (solid curve) and experimental (dotted curve) reflectance-voltage curves.

FIG. 14 shows the results for the RSTN mode. The solid line is the numerical solution using the conditions of $\phi$=190°, $\alpha$=−54° and d$\Delta$n=0.56 $\mu$m. The values of the elastic constants used for this calculation are those of a typical STN liquid crystal MLC-5300 with a pretilt angle of 5°. It can be seen that a threshold voltage of 2 volts is obtained, followed by a sharp drop in reflectance. The steepness of this R-V curve is good enough for multiplex applications similar to transmissive STN. The most important observation about FIG. 14 is that R is near 0% over a wide voltage range. Green light at 550 nm was assumed in this calculation.

Several experimental RSTN cells were made. The d$\Delta$n value was adjusted by using a 4-bottle system. The measured reflectance as a function of voltage for green light (dotted line) is shown together with the simulated result in FIG. 14. It is interesting to note that the dark state of the experimental R-V curve is actually broader than the theoretical one. From the experimental values, the measured contrast was over 200:1. This is much better than conventional STN LCD.

Figure 15:
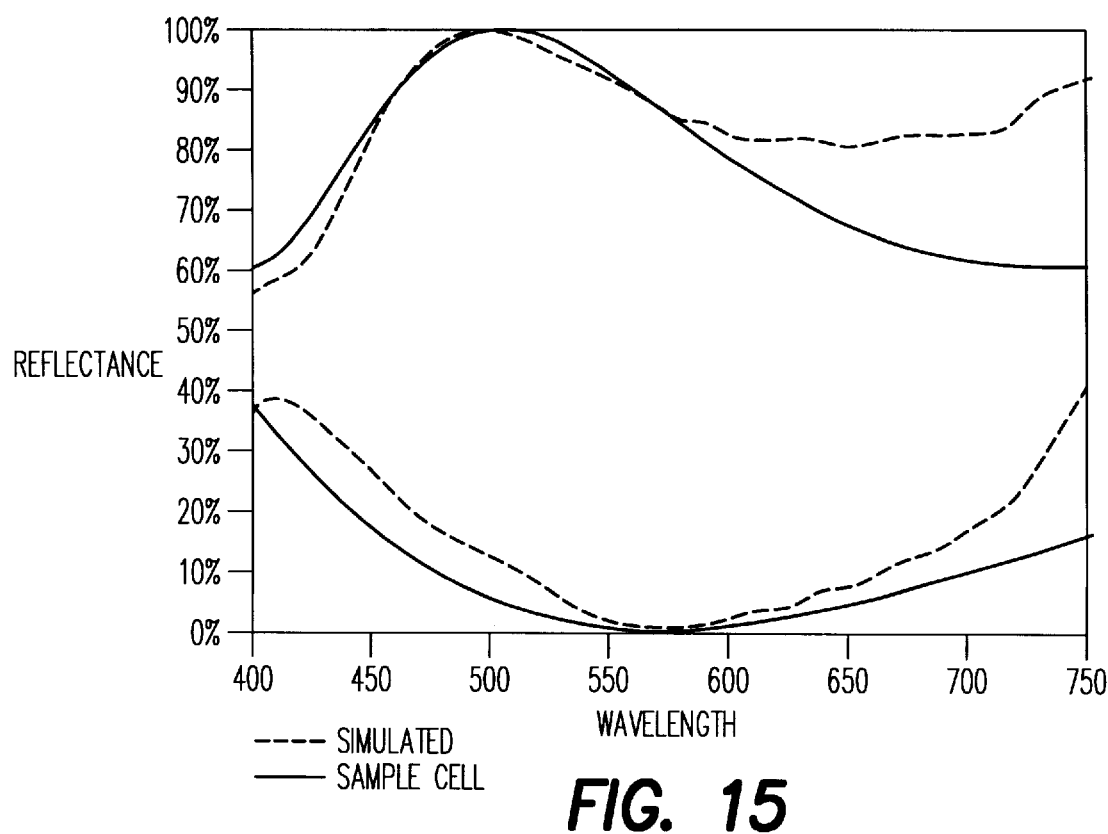
FIG. 15 shows complete reflectance spectrum for both the field-off state and the field-on state of simulated (solid curve) and experimental (dotted curve) cells at 2.7 volts.

The completed calculated (solid lines) and experimental (dotted lines) reflectance spectrum are shown in FIG. 15 for both the field-off state and the field-on state at 2.7 volts. It can be seen that there is good agreement between the numerical predictions and the experimental results as well. The dispersion characteristics of the RSTN is much better than conventional STN. Comparing FIG. 15 with the yellow mode spectrum of ordinary STN, we see that for the field-on state, there is only a 20% variation in reflectance while there is about 50% variation for the yellow mode[16]. Therefore, the RSTN mode is better than STN in terms of low chromatic dispersion as well. Like STN, it also has a good steepness coefficient in the R-V curve so that a high degree of multiplexing is possible in a passive matrix display. One additional potential advantage of RSTN is that it may have a better viewing angle than STN. Without the rear polarizer, the RSTN is effectively 2 tandem LC cells between 2 polarizers. The 2 cells are twisted in opposite directions similar to double STN (DSTN) cell compensation. So there may be some intrinsic self-compensating action at oblique viewing angles for the RSTN.

There is some deviation between the solid lines ad the dotted lines in FIG. 14 and FIG. 15. This is because of the wavelength dispersion of the refractive index difference $\Delta$n of the liquid crystal. The values of the elastic constants we used for the simulation were also slightly different from the experimental value which was obtained by adjusting the LC $\Delta$n using a 4-bottle system. Cell parameter deviations may also be caused by the fabrication process. Additionally, the polarizer parameters were not exactly known in the calculations. Despite all these effects, the agreement between theory and experiment is quite good.

In summary, the use of a full parameter space search approach allows excellent performance reflective LCDs to be obtained. The design is based on the realization that for the TN-ECB mode, it is better to use a NW operation than the NB operation that was used before. By using the dynamic simulation, it is possible to find operating conditions that produce near perfect dark state under an applied voltage situation. Thus the contrast of these displays are extremely large. The optical conditions are also such that the RTN display can be easily fabricated with reasonable cell thicknesses. This display mode can work well with a parallel polarizer geometry or a perpendicular polarizer geometry. The former case corresponds to a plane polarizer and is suitable for direct view situations. The latter geometry corresponds to a prism cube polarizer and is useful for projection displays.

We claim:

1. A reflective liquid crystal display consisting essentially of an input polarizer, a liquid crystal cell and a rear reflector and having no retardation film and wherein said liquid crystal cell has a twist angle ($\phi$)=52±5° and a value of d$\Delta$n=0.52±0.5 $\mu$m where d=thickness of the cell and $\beta$n=birefringence of the cell, and wherein the angle of the input polarizer is −52+10° to the input director of the liquid crystal cell.

2. A reflective liquid crystal display consisting essentially of an input polarizer, a liquid crystal cell and a rear reflector and having no retardation film, and wherein said liquid crystal cell has a twist angle ($\phi$)=52±5° and a value of d$\Delta$n=0.52±0.5 $\mu$m where d=thickness of the cell and $\Delta$n=birefringence of the cell, and wherein the angle of the input polarizer is a non-zero value in the range of −5±10° to the input director of the liquid crystal cell.

3. A reflective liquid crystal display consisting essentially of an input polarizer, a liquid crystal cell and a rear reflector and having no retardation film, and wherein said liquid crystal cell has a twist angle ($\phi$)=192±5° and a value of d$\Delta$n=0.56±0.5 $\mu$m where d=thickness of the cell and $\Delta$n=birefringence of the cell, and wherein the angle of the input polarizer is −52±10° to the input director of the liquid crystal cell.

4. A reflective liquid crystal display consisting essentially of an input polarizer, a liquid crystal cell and a rear reflector and having no retardation film, and wherein said liquid crystal cell has a twist angle (φ)=192±5° and a value of dΔn=0.56±0.5 μm where d=thickness of the cell and Δn=birefringence of the cell, and wherein the angle of the input polarizer is a non-zero value in the range of −5±10° to the input director of the liquid crystal cell.

5. A display as claimed in any of claims 1, 2, 3, or 4 wherein said reflector is located inside said liquid cell.

6. A display as claimed in any of claims 1, 2, 3, or 4 wherein said reflector is located outside said liquid cell.

7. A display as claimed in any of claims 1, 2, 3, or 4 wherein said input polarizer is a sheet polarizer.

8. A display as claimed in any of claims 1, 2, 3, or 4 wherein said input polarizer is a prism cube beam splitting polarizer.

9. A display as claimed in any of claims 1, 2, 3, or 4 wherein said reflector is partitioned into a matrix comprising a plurality of pixels in columns and rows.

10. A display as claimed in claim 9 wherein said pixels may be driven separately in an active matrix.

11. A display as claimed in claim 4 wherein said pixels may be driven by multiplexing column and row voltages in a passive matrix.

* * * * *